(12) United States Patent
Donnet et al.

(10) Patent No.: US 11,399,916 B2
(45) Date of Patent: Aug. 2, 2022

(54) MIXING CHAMBER AND HANDPIECE

(71) Applicant: FERTON HOLDING S.A., Delémont (CH)

(72) Inventors: Marcel Donnet, Saint Jean de Gonville (FR); Rigolet Guillaume, Saint Sulpice (CH)

(73) Assignee: FERTON HOLDING S.A., Delémont (CH)

( * ) Notice: Subject to any disclaimer, the term of this patent is extended or adjusted under 35 U.S.C. 154(b) by 0 days.

(21) Appl. No.: 16/469,424

(22) PCT Filed: Dec. 5, 2017

(86) PCT No.: PCT/EP2017/081478
§ 371 (c)(1),
(2) Date: Jun. 13, 2019

(87) PCT Pub. No.: WO2018/108622
PCT Pub. Date: Jun. 21, 2018

(65) Prior Publication Data
US 2019/0388186 A1 Dec. 26, 2019

(30) Foreign Application Priority Data
Dec. 13, 2016 (DE) ...................... 10 2016 124 212.8

(51) Int. Cl.
*A61C 3/00* (2006.01)
*A61C 3/025* (2006.01)
(Continued)

(52) U.S. Cl.
CPC .......... *A61C 3/025* (2013.01); *A61C 17/0217* (2013.01); *B24C 5/02* (2013.01)

(58) Field of Classification Search
CPC ... A61C 3/025; A61C 17/0217; A61C 17/024; A61C 17/028; A61C 17/032; B24C 5/02
See application file for complete search history.

(56) References Cited

U.S. PATENT DOCUMENTS

| | | | |
|---|---|---|---|
| 783,218 A | * | 2/1905 | Murray ................. B24C 7/0046 451/99 |
| 822,379 A | * | 6/1906 | Luckenbach ......... B05B 7/0408 239/428 |

(Continued)

FOREIGN PATENT DOCUMENTS

| | | |
|---|---|---|
| AT | 314723 B | 4/1974 |
| GB | 1333155 | 10/1973 |

(Continued)

OTHER PUBLICATIONS

International Search Report for corresponding application PCT/EP2017/081478 filed Dec. 5, 2017; dated Feb. 14, 2018.

(Continued)

*Primary Examiner* — Nicholas D Lucchesi
(74) *Attorney, Agent, or Firm* — Cantor Colburn LLP

(57) ABSTRACT

A mixing chamber for a handpiece of a medical device, in particular a dental abrasive jet device, having a first supply line for a first fluid stream, in particular a liquid fluid flow, and a second supply line for a second fluid flow, in particular a powder/air mixture, where the two supply lines extend along a central axis and the second supply line-ends within the mixing chamber in an outlet the mixing chamber having a mixing region, in which the first fluid flow is deflected towards the second fluid flow, downstream of the outlet, and an accelerating region in which the first supply line extends parallel to the second supply line over the length of at least 3 mm.

11 Claims, 2 Drawing Sheets

(51) Int. Cl.
  *A61C 17/02* (2006.01)
  *B24C 5/02* (2006.01)

(56) References Cited

U.S. PATENT DOCUMENTS

| | | | | |
|---|---|---|---|---|
| 2,325,517 A * | 7/1943 | Robert | ................ | B24C 7/0046 |
| | | | | 451/102 |
| 2,717,476 A | 7/1953 | Myers | | |
| 4,214,871 A * | 7/1980 | Arnold | ................ | A61C 3/025 |
| | | | | 433/216 |
| 4,462,803 A * | 7/1984 | Landgraf | ................ | A61C 3/025 |
| | | | | 433/125 |
| 4,595,365 A | 6/1986 | Edel | | |
| 4,975,054 A * | 12/1990 | Esrock | ................ | A61C 17/0217 |
| | | | | 433/126 |
| 4,984,984 A * | 1/1991 | Esrock | ................ | A61C 3/025 |
| | | | | 433/88 |
| 5,094,615 A | 3/1992 | Bailey | | |
| 5,765,759 A | 6/1998 | Bruns | | |
| 6,354,924 B1 * | 3/2002 | Trafton | ................ | B24C 7/0046 |
| | | | | 451/101 |
| 6,432,114 B1 * | 8/2002 | Rosso | ................ | A61B 17/545 |
| | | | | 606/131 |
| 7,762,812 B2 * | 7/2010 | Pichat | ................ | A61C 19/063 |
| | | | | 433/82 |
| 7,980,923 B2 * | 7/2011 | Olmo | ................ | A61C 3/025 |
| | | | | 451/99 |
| 8,458,841 B2 * | 6/2013 | Haas | ................ | A61C 17/222 |
| | | | | 15/29 |
| 8,573,974 B2 * | 11/2013 | Janssen | ................ | A61C 17/0217 |
| | | | | 433/88 |
| 9,339,350 B2 * | 5/2016 | Olmo | ................ | A61C 3/025 |
| 9,364,304 B2 * | 6/2016 | Berger | ................ | B08B 9/032 |
| 9,888,980 B2 * | 2/2018 | Boehm | ................ | A61C 3/025 |
| 2003/0027100 A1 | 2/2003 | Grant | | |
| 2004/0202980 A1 | 10/2004 | Policocchio | | |
| 2005/0233280 A1 | 10/2005 | Hamman | | |
| 2012/0329005 A1 * | 12/2012 | Olmo | ................ | A61C 3/025 |
| | | | | 433/88 |
| 2013/0266908 A1 | 10/2013 | Casabonne | | |
| 2014/0104973 A1 * | 4/2014 | Don | ................ | B24C 7/0046 |
| | | | | 366/101 |
| 2015/0034135 A1 * | 2/2015 | Berger | ................ | B01D 25/19 |
| | | | | 134/166 R |
| 2016/0270889 A1 | 9/2016 | Casabonne | | |

FOREIGN PATENT DOCUMENTS

| | | |
|---|---|---|
| WO | 03011164 A1 | 2/2003 |
| WO | 2007147552 A1 | 12/2007 |

OTHER PUBLICATIONS

International Preliminary Report of Patentability for corresponding PCT/EP2017/081478 filed Dec. 5, 2017; dated Jun. 13, 2019.

\* cited by examiner

MIXING CHAMBER AND HANDPIECE

TECHNICAL FIELD

The present disclosure concerns a mixing chamber for a handpiece of a medical device, in particular a dental powder jet device, and a handpiece for a dental powder jet device.

BACKGROUND

For the discussed powder jet or abrasive jet devices for cleaning tooth surfaces, there is the problem of dust generation during the treatment. The powders used for tooth cleaning consist of very fine particles which impinge on the tooth surface in order to establish the corresponding cleaning effect, but at the same time whirl around during treatment and deposit in the treatment zone. In order to solve this problem, it is known from the state of the art that the abrasive powder stream, in particular powder/air stream, is mixed, swirled or enveloped with a water stream. It is advantageous to envelope the powder/air mixture with water before it hits the tooth, but then to mix it so that the powder can be washed out of the mouth.

The US 2004/0202980 A1, for example, discloses a handpiece for a dental cleaning device in which a chamber for a cleaning solution exists in the handpiece, which can be applied to the tooth surface together with an air jet. However, the cleaning effect of such a "mixture" is comparatively low, since the kinetic energy of the cleaning jet is not sufficiently high. The powder is only present in the solution (suspension).

The U.S. Pat. No. 5,094,615 discloses a handpiece with a mixing chamber in which water and an abrasive medium are mixed within the handpiece. Here, too, the cleaning effect is rather low, since the abrasive medium (powder crystals) loses much of its kinetic energy through early mixing with the water stream.

BRIEF SUMMARY

The present disclosure provides a mixing chamber for a handpiece of a medical device, in particular a dental powder jet device, as well as a handpiece for a dental powder blasting device, which eliminate the aforementioned disadvantages and provide a slim and thin cleaning jet which works effectively and as dust free as possible.

According to the disclosure, a mixing chamber for a handpiece of a medical device, in particular a dental powder or abrasive jet device, has a first supply line for a first fluid stream, in particular a liquid stream, and a second supply line for a second fluid stream, in particular a powder/air mixture, which at least in sections extend along a central axis, the second supply line ending inside the mixing chamber in an outlet, the mixing chamber having a mixing region, in which the first fluid stream is directed onto the second fluid stream, directly following the outlet or behind the outlet (relative to a flow direction), the mixing chamber having an acceleration region in which the first supply line extends over a pre-definable length of preferably at least 3 mm substantially parallel to the central axis of the second supply line. It is advisable for the mixing chamber to form the first supply line by an appropriately shaped inner wall. The first supply line forms the mixing region or any existing guide regions, while the second supply line ends inside the mixing chamber in the outlet. This outlet can also be called an "inner nozzle". The end of the first supply line or mixing chamber can be referred to as the "outer nozzle".

The mixing chamber or a housing of the mixing chamber can be made of metal, ceramic and/or plastic according to various embodiments, for example, wherein the shape or contour of the inner wall can be cast and, if necessary, reworked or produced directly, for example by drilling or milling or 3-D printing. According to a preferred embodiment, the central axis is in particular a rotational axis of the mixing chamber. The mixing chamber can comprise or form the second supply line, however the second supply line can also be a separate component which is arranged correspondingly in or on the mixing chamber or its housing, or vice versa. According to one embodiment, the mixing chamber/housing is, for example, interchangeable, enabling mixing chambers of different dimensions, to be adapted to the type of powder used, for example to be arranged on the handpiece, e.g. screwed or plugged in.

Water is used as the liquid stream/first fluid stream according to a preferred embodiment. Due to the advantageous embodiment of the mixing chamber, powders with very small particle sizes, for example smaller than 25 μm, down to about 12 μm, or even smaller, can also be used as (tooth cleaning) powders. The provision of the acceleration region has proved to be particularly advantageous, as it increases or maintains the kinetic energy of the liquid flow. The energy-rich first fluid stream is directed via the mixing region in the direction of or onto the second fluid stream, wherein it does not extract any energy from this, as it has a high energy level itself due to the acceleration region. In other words, the first fluid stream does not "slow down" the second fluid stream and the result is an ideal cleaning jet that does not expand or only expands slightly after leaving the mixing chamber. From the state of the art it is known to use the Venturi effect for mixing the two currents or for admixing, for example. This has the disadvantage that energy is extracted from at least one of the two fluid streams. The result is that the resulting cleaning jet, which comprises the first and second fluid stream, has less energy and, in particular, fluctuates in composition. Due to the low speed of such a cleaning jet, it expands rapidly after it has left the mixing chamber, resulting in strong dust generation or less precise treatment of the tooth. The acceleration region, which in preferred embodiments has a minimum length of at least 3 mm, 4 mm, 5 mm or more, in particular in conjunction with the shape of the mixing chamber, causes the first fluid stream, when it meets the second fluid stream in the mixing range, not to slow it down but to form or mix ideally with it or form a shell around it. The result is a very slim or fine cleaning jet, which significantly reduces the generation of dust and enables very precise work. The first fluid stream preferentially envelops the second fluid stream.

The velocities of the two fluid streams are matched to each other in different embodiments, wherein it can be advantageous, depending on the type of powder used, if a velocity of the first fluid stream is higher than a velocity of the second fluid stream.

It is advisable that the first supply line is a pressure line, which is adapted to direct a pressurized first fluid stream to the mixing region. Common pressure ranges, for example, are in the range of about 0 to 2 bar. As a consequence, the speed of the first fluid stream can also be controlled and adjusted by the level of pressure. The second fluid stream is also under pressure, wherein this refers in particular to an air pressure, for example in a range from about 1.5 to 5.5 bar.

In accordance with a preferred embodiment, the first supply line in the acceleration region essentially has the shape of a hollow cylinder. In other words: the first supply line expediently encloses/envelopes the second supply line.

Correspondingly, the first supply line in the acceleration region has an inner diameter and an outer diameter, whereby the outer diameter of the first supply line is formed by the inner wall of the mixing chamber. In various embodiments, the outer diameter of the first supply line in the acceleration region is, for example, in a range from about 1.2 to 2.7 mm, expediently in a range from about 1.4 to 2.5 mm and preferably in a range from about 1.4 to 2 mm. The internal diameter is expediently within a range of about 0.8 to 1.5 mm, preferably within a range of about 0.9 to 1.4 mm and particularly preferably within a range of about 1 to 1.3 mm.

In the case of non-circular feed or mixing chamber cross-sections, the distance (viewed from the front into the nozzle) between the inner wall of the second feed at the outlet, i.e. the inner nozzle, and the inner wall of the front guide region, in particular of an end outlet, i.e. the outer nozzle, is 0.1 mm to 0.4 mm, preferably approx. 0.2 mm. According to the understanding of the disclosure, these values are valid for non-round nozzles and non-constant distances on average or for the predominant part of the pipe or nozzle sections. The preferred values for the inside diameters of circular line cross-sections, i.e. nozzles, are: Second line or inner nozzle: min 0.5 mm, max 0.9 mm, preferably 0.65 mm; front guide region or outer nozzle: min 0.85 mm, max 1.5 mm, preferably 1.05 mm, particularly preferred if the inner nozzle has 0.65 mm. For non-circular line cross-sections, the preferred regions for the inner nozzle are about 0.19-0.65 $mm^2$, preferably about 0.33 $mm^2$ and for the outer nozzle about 0.56-1.77 $mm^2$, preferably about 0.86 $mm^2$.

In accordance with a preferred embodiment, the second supply line is formed by a pipe section. It has already been mentioned that the second supply line can be a separate component. As mentioned above, the second supply line is configured in such a way that the mixing chamber or its housing can be placed on or at the mixing chamber, e.g. plugged in. The mixing chamber can therefore also be understood as a kind of attachment which can be attached or plugged to a pipe section or to a housing of a handpiece. An inner diameter of the second supply line, which is preferably round, in particular circular, or a diameter of the outlet, i.e. of the inner nozzle, lies in a range from about 0.5 mm to 0.9 mm, preferably 0.65 mm, according to various embodiments.

According to an embodiment, the aforementioned hollow cylindrical form of the first supply line in the acceleration region is formed by the fact that the mixing chamber is plugged onto or to a corresponding second supply line or onto or to a housing of the hand-piece, screwed on, etc., wherein an outer wall of the second supply line forms the inner diameter of the first supply line.

At this point it should be mentioned that the first supply line in the acceleration region does not have to completely enclose the second supply line. The first supply line can also be formed by a number of axial channels arranged around the second supply line. The channels, for example, can have a round or angular cross-section. The channels can also extend segmentally around the second line.

The mixing region is expediently formed by the fact that the inner wall of the mixing chamber tapers towards the central axis, in particular conically.

According to preferred embodiments, the inner wall in the mixing region has an angle relative to a cross section of the mixing chamber which lies in a range from about 0 to 80°, preferably in a range from about 0 to 30°. The cross-section, in turn, defines a plane of the mixing chamber to which the central axis is perpendicular. A length of the mixing region, measured along the central axis, is in the range of about 0.1 to 0.5 mm according to various embodiments, for example. The term "tapered" means that the inner wall, although tapered, is straight. The inner wall can also have a convex or concave shape in the mixing region. It is also possible to provide a wave or serrated shape in the circumferential direction of the mixing region in order to influence the mixing of the two fluid streams if necessary. Through the targeted use of this technique, it is possible to generate a cleaning jet which is not symmetrical in relation to the central axis or which does not exit the mixing chamber essentially parallel to the central axis but, for example, inclined or oblique to it, which can be advantageous for certain treatment situations, e.g. in order to reach places which are difficult to reach.

According to one embodiment, several mixing regions are provided, for example two or three, which are arranged one behind the other, wherein the angles from mixing region to mixing region preferably decrease. Alternatively, the "last" mixing region can also have a larger angle to allow even more uniform mixing.

According to one embodiment, the first and second supply line or the mixing chamber in relation to the handpiece can be rotated/positioned relative to each other so that the e.g. non-symmetrical or inclined cleaning jet can be actively deflected.

According to one embodiment, the mixing chamber has at least one front guide region disposed between the end outlet and the mixing region, the front guide region having a length between 0 and 0.5 mm according to different embodiments.

The front guide region is also formed by the inner wall of the mixing chamber and has a diameter which preferably corresponds to an outer diameter of the first supply line in the acceleration region. Alternatively or additionally, it may be possible to provide several front guide regions, e.g. two or three, which each cause a diameter reduction or enlargement, e.g. in a range of about 10 to 20%. If necessary, energy from the first fluid stream can thus be specifically degraded upstream of the mixing region or turbulence can be generated to influence the formation of the cleaning jet. In this respect, the front guide region can correspond to the mixing region both geometrically and in terms of its function.

The length of the front guide region can be adjusted according to one embodiment. This allows a targeted reaction to different powders and their flight characteristics. In order to achieve adjustability, the mixing chamber/first supply line can be moved or rotated relative to the second supply line along the central axis, for example, by means of a corresponding thread, so that the length can be adjusted correspondingly.

According to a preferred embodiment, the mixing chamber has at least one rear guide region which is arranged behind the mixing region, wherein the rear guide region, for example, has a length between 0.3 and 1.2 mm, preferably between 0.5 and 1 mm. In the rear guide region, where the cleaning jet is already mixed or formed/shaped, it can be "calmed down" over the length of the rear guide region, so that a slim jet is produced which does not widen/open even after exit. The wall of the rear guide region is preferably essentially cylindrical, but can also be conical, tapered or widened to form the cleaning jet again before it leaves the mixing chamber. According to one embodiment, the mixing chamber has more than one rear guide region, wherein it also applies here that the diameters of the rear guide regions arranged one behind the other can, for example, be reduced or increased by about 10 to 20% from guide region to guide region. It is also possible, especially in the guide region, which ultimately forms the nozzle opening or encompasses it, to provide a corresponding internal geometry via which the shape of the cleaning jet can still be specifically influenced if necessary. It has proved advantageous, for example, to provide axially running grooves in order to further intensify the enveloping/mixing of the first and second fluid streams. The rear guide region can also be at an angle to the central axis in order to deflect the cleaning jet accordingly. The advantages of such a deflected cleaning jet, especially in connection with a rotating mixing chamber, have already been mentioned.

It is advantageous that the rear guide region has a clear passage equal to or larger than the clear passage of the second line at the outlet, i.e. the clear passage of the inner nozzle. In other words: the surface of the cross-section perpendicular to the central axis of the rear guide region is larger than that of the inner nozzle. The ratio of the corresponding surfaces should be greater than or equal to 1 but not greater than 1:10, preferably about 1:2.5. For example, the inner nozzle then has a diameter of preferably 0.65 mm and the outer nozzle a diameter of 1.05 mm.

The mixing chamber expediently has a nozzle opening, wherein a nozzle diameter is about 30 to 70% of an (outer) diameter of the acceleration region. This ensures that the emerging cleaning jet retains its compact shape even at the exit. In preferred embodiments, the diameter of the nozzle opening is approximately 0.9 to 1.7 mm, particularly approximately 1.1 to 1.5 mm, particularly approximately 1.1 to 1.3 mm. The same applies to the (smallest) diameter of the rear guide section.

According to one embodiment, the front guide region, the mixing region and/or the rear guide region have at least one, in particular radially arranged, entrance or an opening/bore. This entrance is intended for the further supply or suction of a fluid, such as air or water. For example, it could be ambient air, but alternatively it would also be possible to connect corresponding pressure hoses for the supply of compressed air/water or an (additional) powder/air mixture.

In a preferred embodiment, the mixing chamber has a front guide region with a length of up to 0.5 mm, which merges over a mixing region into a rear guide region with a length of approximately 0.5 to 1 mm. The inclination of the inner wall of the mixing region, relative to a cross-section of the mixing chamber, is in a range of about 0 to 30°. The inner diameter of the mixing chamber, formed by its inner wall, has a range of about 1.4 to 2 mm in the acceleration region and in the front guide range. A diameter of the rear guide region as well as the nozzle opening lies in a range of about 1.4 to 2 mm. This ensures that the powder/air mixture, which has the actual cleaning function, does not lose any energy when mixed with the water jet and is "not disturbed" so to speak. In addition, the geometry described enables precise mixing and in particular enveloping of the powder/air mixture with the water stream (first fluid stream), which successfully prevents any dust generation.

The present nozzle geometry is very compact. The distance between outlet and end-outlet, i.e. between inner and outer nozzle is very small, approx. 1-8 mm, preferably approx. 2-4 mm. The ratio of the nozzle diameter, i.e. the diameter of the inner to the outer nozzle, is also small and is advantageously only about 2:1-1:1, preferably about 1.5:1. As a result, the outer nozzle or the walls of the mixing chamber and the rear guide region are not hit by powder particles or only slightly hit by them and do not wear out as quickly as in the state of the art.

The disclosure also refers to a handpiece for a dental powder jet device with a mixing chamber in accordance with the disclosure. The advantages and characteristics already mentioned in connection with the mixing chamber apply analogously and correspondingly and vice versa.

BRIEF DESCRIPTION OF THE DRAWINGS

Further advantages and features result from the following description of the preferred embodiments of the mixing chamber according to the disclosure with reference to the enclosed figures. Individual characteristics of the individual embodiment forms can be combined with each other within the scope of the disclosure.

DETAILED DESCRIPTION

Figure 1:
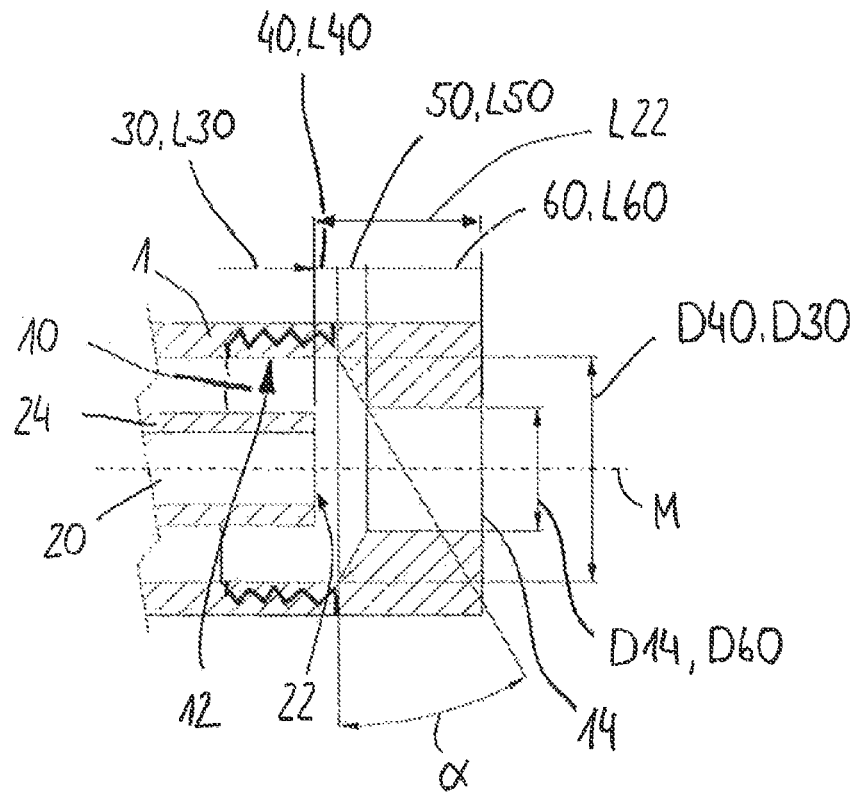
FIG. 1: shows a preferred version of a mixing chamber according to the disclosure.

FIG. 1 shows a preferred embodiment of a mixing chamber with a housing 1 comprising an inner wall 12. The mixing chamber has an acceleration region 30, which has a length L30 of at least 3 mm along a central axis M. The mixing chamber has a length L30 of at least 3 mm. In the acceleration region 30, an essentially hollow cylindrical first supply line 10 extends around a second supply line 20. The second supply line 20 is formed by a pipe section or a tubular section 24, which ends in an outlet 22. This is the inner nozzle. Along the central axis M there is further formed a mixing region 50 with a length L50, which is formed by the fact that the inner wall 12 of the mixing chamber extends at an angle α with respect to a cross-section of the first supply line 10 which is perpendicular to the central axis, wherein the angle is in a range of about 0 to 30° according to preferred embodiments.

Between the mixing region 50 and the acceleration portion 30, there is a front guide region 40 having a length L40 which is about 0 to 0.5 mm in preferred embodiments. Behind the mixing region 50, a rear guide region 60 with a length of L60 is formed, which forms an end outlet or outer nozzle opening 14, through which the cleaning jet finally leaves the mixing chamber. The outer nozzle opening 14 has a nozzle diameter D14, which is, for example, in a range of about 1.1 to 1.5 mm, preferably in a range of about 1.1 to 1.3 mm. A diameter D30 of the first supply cable 10 in the acceleration region 30 or a diameter D40 of the front guide range 40 lies in a range of about 1.4 to 2.5 mm in preferred embodiments and in a range of about 1.4 to 2 mm in particularly preferred embodiments.

Figure 2A:
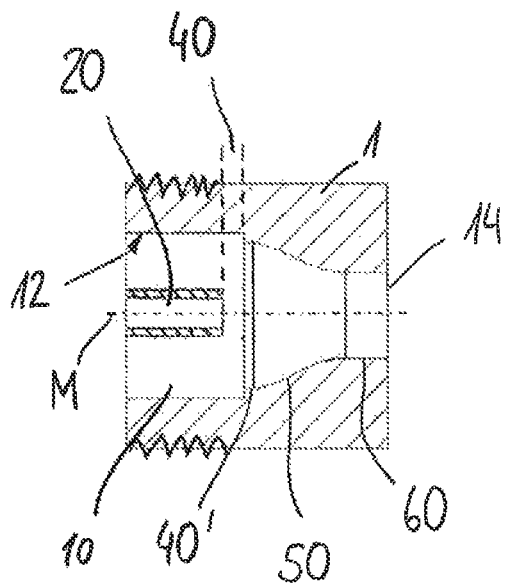
FIGS. 2*a*, 2*b*: show other types of mixing chambers.

FIG. 2*a* shows another version of a mixing chamber. As a special feature, a mixing region 50 is revealed here, which is configured to direct the first fluid stream in the direction of the central axis M, wherein the inner wall 12 is not straight, but approximately arcuate/convex. A second supply line 20 is arranged in such a way that two front guide regions 40 and 40' are formed. The two guide regions 40 and 40' have different diameters and therefore form a shoulder over which the flow energy of the first fluid stream can be specifically removed.

Figure 2B:
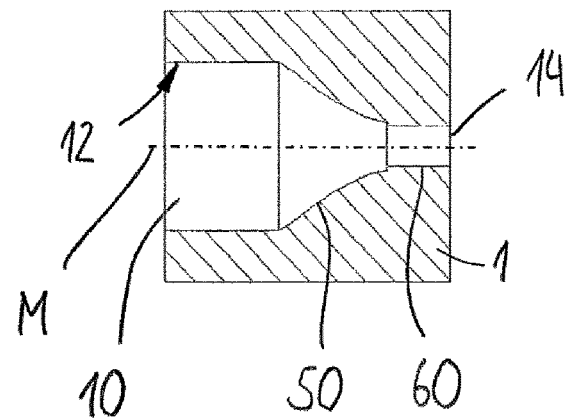

FIG. 2*b* shows another embodiment of a mixing chamber with a convex shaped mixing region 50. As a special feature, a shoulder is formed between the mixing region 50 and the rear guide region 60. The arrangement of a second supply line is not shown here. However, it becomes clear that, depending on how a second supply line is arranged, a front guide region or its dimensioning can be influenced.

Figure 3:
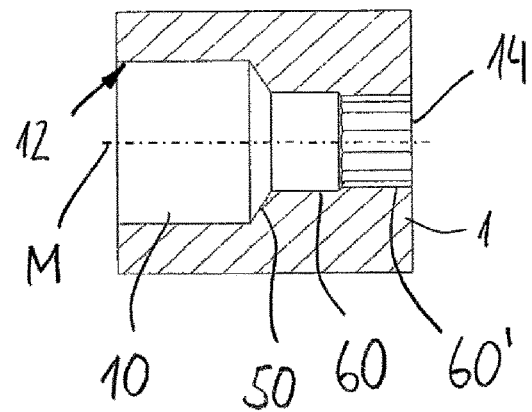
FIG. 3: shows a version of a mixing chamber with two rear guide regions.

FIG. 3 shows an embodiment of a mixing chamber which has a first rear guide region 60 and a second rear guide region 60'. A special feature of the second 60' rear guide region is its essentially corrugated inner contour.

Figure 4:
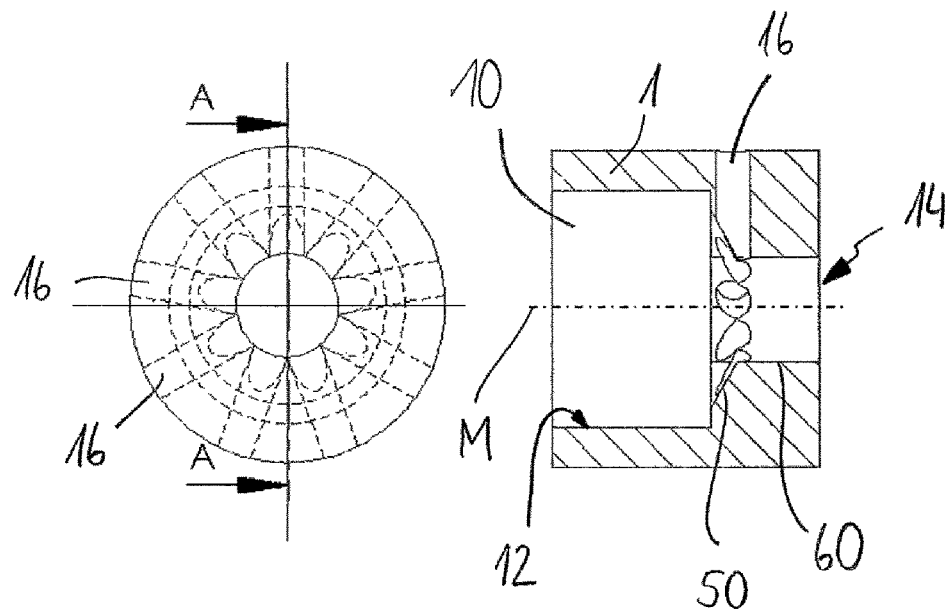
FIG. 4: shows a version of a mixing chamber with radial entrance.

FIG. 4 shows in a frontal view and in a section A-A a mixing chamber which has in a mixing region 50 a plurality of radially extending entrances/openings 16.

The not explicitly mentioned features of the FIGS. 2a, 2b, 3 and 4 correspond to those known from FIG. 1 and are therefore not mentioned again.

The invention claimed is:

1. A mixing chamber for a handpiece of a medical device, the mixing chamber comprising:
    a first supply line for a first fluid stream; and
    a second supply line for a second fluid stream;
    wherein the two supply lines extend at least in sections along a central axis of the second supply line;
    wherein the second supply line ends inside the mixing chamber in an outlet;
    the mixing chamber further comprising
    a mixing region, in which the first fluid stream is directed onto the second fluid stream, behind the outlet; and
    an acceleration region, in which the first supply line extends over a pre-definable length parallel to the central axis;
    wherein the mixing chamber has at least one front guide region disposed between the outlet and the mixing region;
    wherein the first supply line is a pressure line adapted to direct a pressurized first fluid stream to the mixing region;
    wherein a distance between the first outlet and the final outlet is between 1mm and 8mm; and
    wherein the acceleration region has a minimum length of at least 3 mm,
    wherein the second supply line is formed by a pipe section, which ends in the outlet
    wherein a length of the at least one front guide region can be adjusted to allow a targeted reaction to different powders and their flight characteristics,
    wherein the first supply line can be rotated relative to the second supply line along the central axis by means of a corresponding thread such that the length can be adjusted.

2. The mixing chamber according to claim 1, wherein the first supply line in the acceleration region has substantially a shape of a hollow cylinder.

3. The mixing chamber according to claim 1, wherein the second supply line is formed by a pipe section at or on which a housing of the mixing chamber is arranged.

4. The mixing chamber according to claim 1, wherein the mixing region is formed by an inner wall of the mixing chamber running towards the central axis.

5. The mixing chamber according to claim 4, wherein the inner wall in the mixing region has an angle, relative to a cross-section of the mixing chamber, which is in a range from about 0 to 80°.

6. The mixing chamber according to claim 1, wherein the at least one front guide region has a length of about 0.8 mm.

7. The mixing chamber according to claim 6, wherein the at least one front guide region has a diameter of about 1.2 to 2.7 mm.

8. The mixing chamber according to claim 7, wherein the at least one front guide region, the mixing region and/or the at least one rear guide region have at least one radially arranged entrance.

9. The mixing chamber according to claim 1, wherein the at least one mixing chamber has at least one rear guide region disposed behind the mixing region, and wherein the rear guide region has a length of about 0.3-1.2 mm.

10. The mixing chamber according to claim 1, wherein the mixing chamber has a nozzle opening, and wherein a nozzle diameter is about 30 to 70% of a diameter of the acceleration region.

11. A handpiece for a dental powder jet device with a mixing chamber according to claim 1.

* * * * *